July 21, 1936.   E. W. BALLENTINE   2,048,421
ROTOR
Filed Aug. 30, 1935   2 Sheets-Sheet 1

Inventor:
Earle W. Ballentine,
By Byrnforth, Lee, Chritton & Wiles,
Attys.

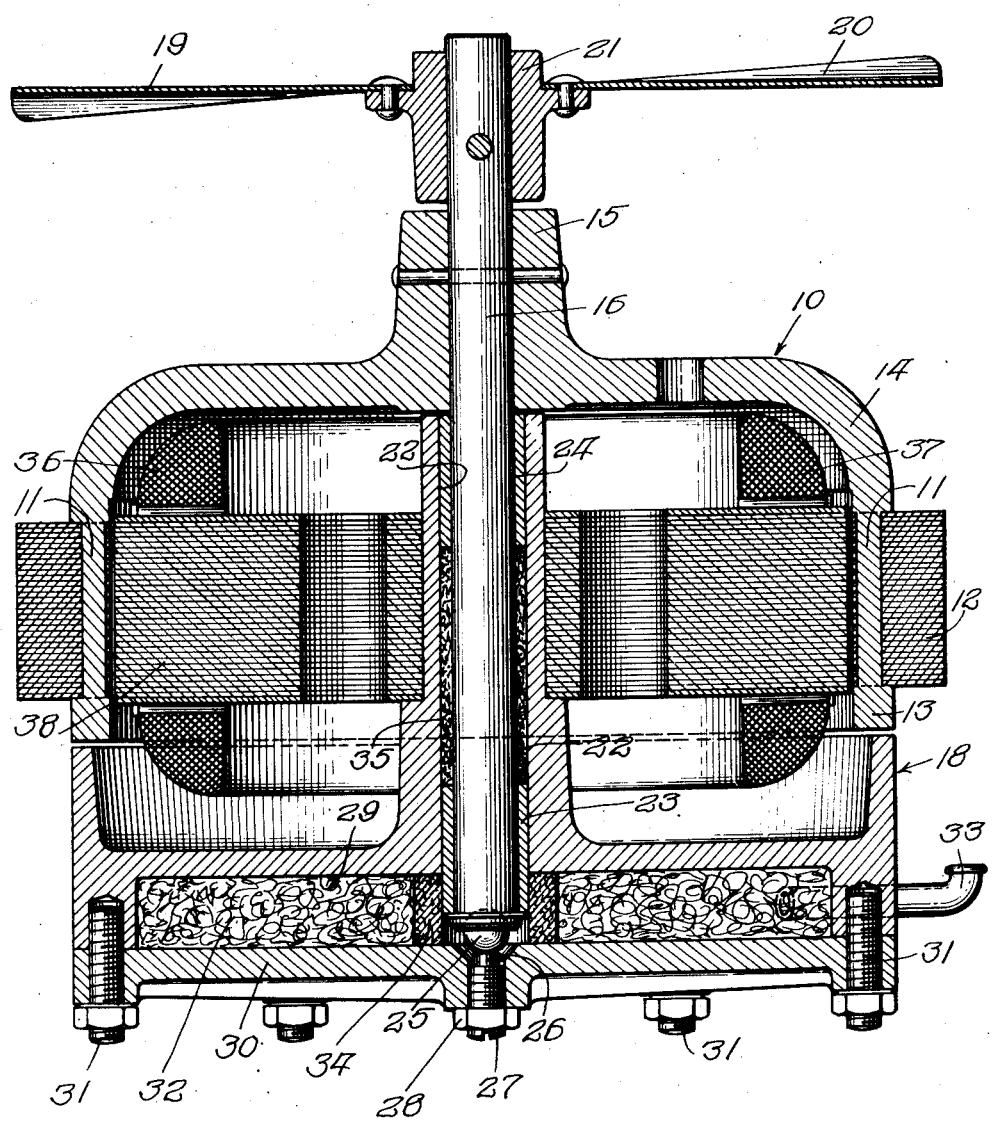

Patented July 21, 1936

2,048,421

UNITED STATES PATENT OFFICE 2,048,421

ROTOR

Earle W. Ballentine, Chicago, Ill., assignor to Solar Industries, Inc., Chicago, Ill., a corporation of Illinois Application August 30, 1935, Serial No. 38,669

15 Claims. (Cl. 172—120)

This invention relates to rotors for induction motors, especially that type known to the trade as squirrel-cage rotors. One object of my invention is to provide a light and simply manufactured rotor which may be cast in one piece. Another object is to provide a rotor with a low moment of inertia. Another object of my invention is to provide a new type of conductor bars in the rotor, of a certain cross-sectional design and a specific electrical resistivity, tending to give quicker starting and smaller losses. Still another object of my invention is to provide a rotor in one piece whereby the possibility of the rotor bars working loose from the end-rings will be obviated. Still other objects of my invention will appear from the following drawings in which—

Figure 1:
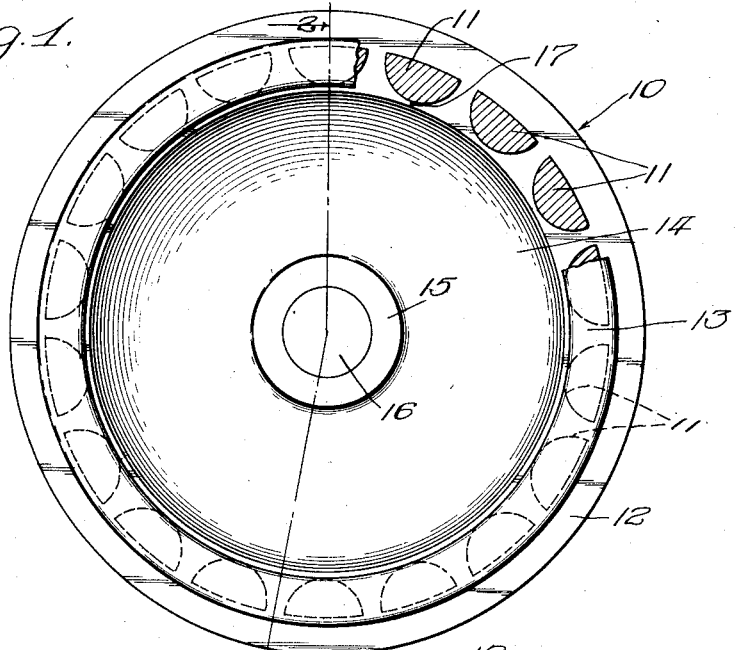
Figure 2:
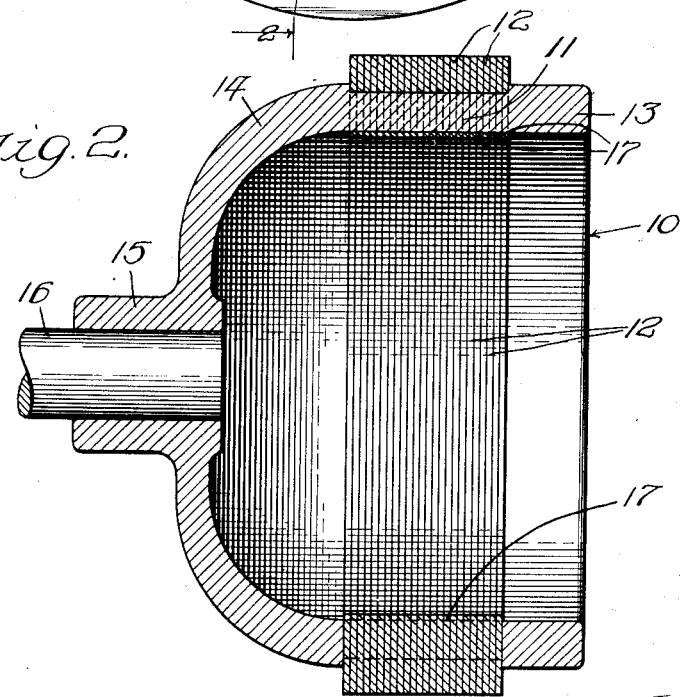

Figure 1 is a side elevation partly in section of the rotor; Fig. 2 is a view taken as indicated by the line 2—2 of Fig. 1; and Fig. 3 is a sectional view of a motor having such a rotor.

This application is a continuation in part of my application Serial No. 715,788, filed March 15, 1934, entitled "Rotor for an induction motor".

There are many disadvantages in squirrel-cage rotors for induction motors as they are commonly used in the art today. This is particularly true where the rotor surrounds the stator. Some rotors are constructed by inserting the conducting bars through the slots in the metal punchings and then welding, brazing or soldering end-rings onto them. The whole is then mounted on a supporting carriage of some kind which permits rotation about a stator. Some rotors have the bars cast integrally with the end-rings, but these still require a separately manufactured and fitted supporting means. As rotors of this type are generally overhung from a bearing at one end of the stator, very good dynamic balance is necessary in order to avoid undue strain on the supporting bearing, or too large an air gap between the rotor and stator. My device obviates all these difficulties by providing a rotor in which the bars, end-rings and supporting means are cast integrally with the laminated metal punchings in one operation, preferably of an aluminum alloy or other light metal.

In the particular embodiment of my device as illustrated in the accompanying drawings, the rotor in general is indicated by the reference numeral 10. The rotor includes the laminated metal punchings 12, usually of iron, and a unitary integral casting which forms the conductor bars 11 passing through slots (here shown as holes) in these laminated punchings, an end-ring 13, a cup-shaped supporting member and end-ring 14, and a collar or bearing member 15. The collar 15 is adapted to be mounted on a shaft 16 either in rotatable or fixed relation thereto. The laminations 12 can have open slots, or very thin portions 17 lying between the bars and the stator of the motor.

My bars are approximately semi-circular in shape, being bounded by an arc of comparatively small radius, the center of which lies toward the outside of the rotor, and by portions of a circle having its center axially concentric with the supporting shaft of the rotor. This shaped bar gives a comparatively large cross-sectional conducting area and, at the same time, offers a narrow surface at the point immediately adjacent to the stator. This shape gives a lower flux density in the rotor with a given rotor depth or a smaller outside diameter of the rotor with a given flux density.

The difficulty of getting a rotor of good dynamic baalnce and concentricity is reduced to a minimum, for it is not necessary in my rotor to fit together and balance two pieces, but merely to machine the one unitary casting. Low moment of inertia is achieved by using a light metal alloy, and by my integral design which tends to keep all of the metal as close to the axis of rotation as is possible in view of the stator within.

In addition to the advantages discussed heretofore, it has been found that an integrally cast rotor of the type disclosed herein has very good heat-dissipating properties. Rotors have heretofore been known and used wherein the end-rings were welded or otherwise joined to the supporting member. A single integrally cast rotor is, however, a much better conductor of heat than a rotor having joints and separations between the same kinds of metal. Under full load, considerable heat is generated in the rotor bars, and must be dissipated therefrom in order to keep the motor temperature within desirable limits. In an integrally cast rotor of the type disclosed herein, the heat flows from the rotor bars through the supporting member radially to the shaft, and not only the end rings but all of the surface of the supporting member has a maximum effectiveness in dissipating this heat to the air.

It is to be noted that the iron laminations 12 necessarily have considerable weight. Consequently, in order to support them, the bars 11 must have a relatively large cross-section. In a motor of this type, however, the cross-sectional size of the bar cannot be increased at will without giving consideration to the electrical resistance.

For example, if copper bars are used, they cannot be made as large as desired because after a certain point, the electrical resistance of the entire bar will become so low as to lower the efficiency of the motor. In my motor, however, I make the bars out of a light metal alloy of high electrical resistance. Consequently, I can make the bars of relatively large cross-section. In this way I attain sufficient strength to support the iron laminations and, at the same time, do not lower the efficiency of the motor. That is, the relatively high electrical resistance of the light metal alloy permits the increase in the cross-section of the bars without lowering the resistance characteristics of the rotor below the desirable point.

Practically all cast rotors heretofore made have employed either aluminum in a practically pure state or a light aluminum alloy of comparatively low electrical resistivity. The electrical resistance of pure copper is a little over 10 ohms per circular mil foot, whereas pure aluminum has a resistance of approximately 17 ohms per circular mil foot. Small amounts of silicon have sometimes been added to aluminum to improve the casting properties, but these usual silicon-aluminum alloys have an electrical resistivity of from 20–25 ohms per circular mil foot. Applicant uses an aluminum-copper-silicon alloy which has a composition comprising approximately 8% of copper and 2% of silicon. This alloy, used to integrally cast the rotor bars and rings and cup-shaped supporting member, has an electrical resistivity of approximately 40 ohms per circular mil foot. It is thus possible to have the cross-sectional area of the rotor bars about 2½ times what could be used with pure aluminum, 4 times the area that would be necessary if copper were used, and about twice the area possible with the usual commercial aluminum-silicon alloy.

The rotor possesses both inductance and resistance. The torque of the motor is at a maximum when the inductive reactance substantially equals the electrical resistance. The resistance can be varied slightly from equality with the inductive reactance, but any such variation of resistance modifies the characteristics of the motor. When the resistance is increased starting torque is increased, but the full load speed is reduced, slip is increased, and speed regulation at full load is much poorer. When the resistance is decreased below this preferred value, full load speed is higher and a better speed regulation is obtained, but the starting torque rapidly decreases to an unsatisfactory value. In other words, the resistance of the rotor, within narrow limits, is fixed by the field requirements, and it is not possible for a motor designer to change this resistance where he has to meet definite torque, full load speed, and electrical resistance limitations for a particular motor application. It is thus apparent that the cross-sectional area of the rotor bars depends entirely upon the specific electrical resistivity of the material employed, since the bars must have a certain definite resistance value to meet the particular requirements of the job to be performed by the motor. The cross-sectional area, and consequent strength of the rotor bars, is not a problem in internal rotors, since there the bars do not carry much mechanical load. Where the rotor is adapted to surround a stationary field, however, the problem of the mechanical strength of the rotor bars becomes important. In a rotor of the type disclosed by applicant herein, wherein the rotor laminations, rotor bars, and end rings are supported from a single bearing by a cup-shaped supporting member, the entire torque of the motor developed in the rotor bars and magnetic laminations immediately adjacent exists as a shearing stress in the rotor bar. In addition, the rotor bars must support the weight of the rotor and resist forces created by impact during shipment or other rough handling of the motor.

In order to obtain the many advantages of integrally casting the end rings, rotor bars, and supporting structure of a rotor adapted to surround a stationary field, it is necessary to obtain considerably stronger rotor bars than is usually the case. The additional strength requisite can be obtained by either using a metal having a high tensile strength, or by enlarging the cross-sectional area of the rotor bars considerably. Mechanical considerations make it preferable to use as light metal as is possible in a rotor of this type, preferably an aluminum or aluminum alloy. Pure aluminum, however, has a tensile strength of only about 10,000 pounds per square inch, and inasmuch as its electrical resistivity is only a little over 1½ times that of copper, the cross-sectional areas of the bars could only be made about 1½ times the area of the bars if copper were used. Such an aluminum rotor is structurally unable to meet the mechanical requirements in a rotor of this type. Applicant's aluminum-copper-silicon alloy not only has an electrical resistivity of approximately 40 ohms per circular mil foot, but has a tensile strength of about 23,000 lbs. per square inch. A rotor bar made of this alloy can thus have a cross-sectional area about 2½ times that in a pure aluminum bar of similar resistance, and since the tensile strength of the alloy is at least twice that of pure aluminum, the resulting rotor bar has a physical strength and resistance to shear more than 5 times that of a rotor bar of equal resistance made of pure aluminum.

An application of the invention disclosed herein is illustrated in Fig. 3. This figure shows, in section, a motor adapted to drive a fan in an air-conditioning installation, for example. The motor has a stationary portion 18 and a rotor 10. The rotor is non-rotatably mounted on the shaft 16 and drives a fan comprising blades 19 and 20 mounted on a hub 21. The stationary portion of the motor 18 has a shaftway 22, which shaftway contains two capillary bearings 23 and 24. These bearings are adapted to receive and rotatably support the shaft 16, which shaft at its lower end is supported by a thrust bearing comprising a ball 25 and bearing member 26. Bearing adjustment means, comprising a screw 27 and lock nut 28, are provided. The lower portion of the motor has therein an annular recess 29, which recess is closed by the base-plate 30 attached to the stationary portion of the motor 18 by any convenient means, here illustrated as bolts 31. The space 29 is here shown as filled with yarn 32, which yarn is adapted to be saturated with oil introduced through the oil cup 33. A felt washer or packing ring 34 is provided surrounding the lower part of the bearing 23 and the thrust bearing, and adapted to keep the yarn from contacting the shaft 16. The packing ring 34, however, permits oil to pass therethrough in sufficient quantities to impregnate the capillary bearing 23, and to be fed to the upper capillary bearing 24 by the capillary material or felt packing 35.

The stationary portion of the motor non-rotatably supports the field coils 36 and 37, and the field laminations 38. The rotor 10 is adapted to surround the stationary field, and to have its rotor laminations 12 and rotor bars 11 immediately adjacent to the field laminations 38. The structural details and advantages of this rotor have been heretofore described, and will not be repeated at this point.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new and desire to secure by Letters Patent is:

1. A rotor adapted to surround a stator, having in combination; laminated metal punchings; conductor bars of approximately semi-circular cross section extending through said punchings, so positioned that their substantially plane surfaces face outwardly; an end-ring cast integrally with said bars at one end thereof; a cup-shaped supporting member cast integrally with said bars at the opposite ends thereof; and a bearing member cast integrally with said cup-shaped member, said bearing member being positioned concentrically with the axis of said rotor.

2. A device as claimed in claim 1, wherein the punchings completely surround the conductor bars.

3. A rotor adapted to surround a stator, having in combination; laminated metal punchings having holes therethrough, substantially semi-circular in cross section with their diameters facing outwardly; and a unitary casting including end-rings, conductor bars extending through said holes, and a supporting member.

4. A rotor adapted to surround a stator, having in combination; laminated metal punchings having holes therethrough, substantially semi-circular in cross-section with their diameters facing outwardly; and a unitary casting including end-rings, conductor bars extending through said holes, a supporting member, and a bearing member.

5. A rotor adapted to surround a stator, having in combination; laminated metal punchings; conductor bars of relatively large cross-section made of metal of relatively high electrical resistance extending through said punchings; and rings integrally cast with said bars; and a cup-shaped supporting member integrally cast with one of said end rings.

6. A rotor adapted to surround a stator, having in combination; laminated metal punchings; conductor bars of relatively large cross-section extending through said punchings, said bars being made of metal having relatively high electrical resistance; and a cup-shaped supporting member cast integrally with said bars.

7. A rotor adapted to surround a stator, having in combination; laminated metal punchings; conductor bars of relatively large cross-section extending through said punchings, said bars being made of a metal having an electrical resistivity of at least 25 ohms per circular mil foot; and a cup-shaped supporting member cast integrally with said bars.

8. A rotor adapted to surround a stator, having in combination; laminated metal punchings; conductor bars of relatively large cross-section extending through said punchings, said bars being made of metal having an electrical resistivity of at least 30 ohms per circular mil foot; and a cup-shaped supporting member cast integrally with said bars.

9. A rotor adapted to surround a stator, having in combination; laminated metal punchings; conductor bars of relatively large cross-section extending through said punchings, said bars being made of a metal having an electrical resistivity of substantially 40 ohms per circular mil foot; and a cup-shaped supporting member cast integrally with said bars.

10. A rotor adapted to surround a stator, having in combination; laminated metal punchings; conductor bars of approximately semi-circular cross-section extending through said punchings, said bars being made of metal having an electrical resistivity of at least 30 ohms per circular mil foot; and a cup-shaped supporting member integrally cast with said bars.

11. A rotor adapted to surround a stator, having in combination; laminated metal punchings; conductor bars of approximately semi-circular cross-section extending through said punchings, said bars having a relatively large cross-section and being made of metal having an electrical resistivity of substantially 40 ohms per circular mil foot; and a cup-shaped supporting member cast integrally with said bars.

12. A rotor adapted to surround a stator, having in combination; laminated metal punchings; conductor bars of approximately semi-circular cross-section extending through said punchings, so positioned that their substantially plane surfaces face outwardly, said bars being of relatively large cross-section and being made of metal having an electrical resistivity of substantially 40 ohms per circular mil foot; an end-ring cast integrally with said bars at one end thereof; and a cup-shaped supporting member cast integrally with said bars at the opposite ends thereof.

13. A rotor adapted to surround a stator, having in combination; laminated metal punchings; conductor bars of relatively large cross-section extending through said punchings, said bars being made of an aluminum alloy having an electrical resistivity of at least 30 ohms per circular mil foot; and a cup-shaped supporting member cast integrally with said bars.

14. A rotor adapted to surround a stator, having in combination; laminated metal punchings; conductor bars of relatively large cross-section extending through said punchings, said bars being made of an aluminum-copper-silicon alloy having an electrical resistivity of at least 30 ohms per circular mil foot; and a cup-shaped supporting member cast integrally with said bars.

15. A rotor adapted to surround a stator, having in combination; laminated metal punchings; conductor bars of approximately semi-circular cross-section extending through said punchings, said bars having a relatively large cross-section and being made of an aluminum-copper-silicon alloy having an electrical resistivity of at least 30 ohms per circular mil foot; and a cup-shaped supporting member cast integrally with said bars.

EARLE W. BALLENTINE.